(12) United States Patent
Ross et al.

(10) Patent No.: US 9,174,731 B2
(45) Date of Patent: Nov. 3, 2015

(54) FIXED ENGINE AND ROTATING PROPROTOR ARRANGEMENT FOR A TILTROTOR AIRCRAFT

(71) Applicant: Bell Helicopter Textron Inc., Fort Worth, TX (US)

(72) Inventors: Brent C. Ross, Flower Mound, TX (US); David R. Bockmiller, Fort Worth, TX (US); John R. McCullough, Weatherford, TX (US); David G. Carlson, North Richland Hills, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 450 days.

(21) Appl. No.: 13/966,678

(22) Filed: Aug. 14, 2013

(65) Prior Publication Data

US 2015/0048213 A1    Feb. 19, 2015

(51) Int. Cl.
 *B64C 29/00*        (2006.01)
(52) U.S. Cl.
 CPC .................................. *B64C 29/0033* (2013.01)
(58) Field of Classification Search
 CPC ...... B64C 29/0033; B64C 27/00; B64C 27/52
 USPC .................................................... 244/60, 7 R
 See application file for complete search history.

(56) References Cited

U.S. PATENT DOCUMENTS

| 4,682,512 | A | | 7/1987 | Peterson | |
| 4,979,698 | A | * | 12/1990 | Lederman | 244/7 R |
| 5,054,716 | A | * | 10/1991 | Wilson | 244/56 |
| 6,260,793 | B1 | * | 7/2001 | Balayn et al. | 244/7 R |
| 6,276,633 | B1 | * | 8/2001 | Balayn et al. | 244/56 |
| 6,607,161 | B1 | * | 8/2003 | Krysinski et al. | 244/7 A |
| 7,520,041 | B1 | | 4/2009 | Aguilar | |
| 7,866,598 | B2 | * | 1/2011 | Waide et al. | 244/7 R |
| 7,871,033 | B2 | * | 1/2011 | Karem et al. | 244/7 A |
| 7,913,947 | B2 | * | 3/2011 | Haynes et al. | 244/56 |
| 2005/0127238 | A1 | * | 6/2005 | Ballew | 244/10 |
| 2012/0199699 | A1 | * | 8/2012 | Isaac et al. | 244/7 R |

FOREIGN PATENT DOCUMENTS

| EP | 1382527 | A1 | 1/2004 |
| EP | 1382527 | A1 | 2/2004 |
| EP | 2484587 | A1 | 8/2012 |
| EP | 2572984 | A1 | 3/2013 |
| EP | 2572984 | A1 | 9/2013 |
| GB | 2353018 | A | 2/2001 |

OTHER PUBLICATIONS

European Search Report in related European Application No. 14161807.4, dated Jul. 24, 2014, 3 pages.

(Continued)

*Primary Examiner* — Justin Benedik
(74) *Attorney, Agent, or Firm* — Noah A. Tevis

(57) ABSTRACT

A tiltrotor aircraft includes a fuselage; a wing member having a first rib, a second rib, a first spar, second spar; and an upper wing skin; an engine disposed at a fixed location relative to the wing member; and a proprotor having a spindle gearbox, rotor mast, and a plurality of rotor blades drivable in rotation about the rotor mast, the spindle gearbox being rotatable about a conversion axis. The spindle gearbox is located above the upper wing skin of the wing member.

16 Claims, 13 Drawing Sheets

(56) References Cited

OTHER PUBLICATIONS

European Official Action in related European Application No. 14161807.4, dated Aug. 26, 2014, 5 pages.
European Search Report in related European Application No. 14150196.5, dated Sep. 3, 2014, 3 pages.
Smailys H et al, "Advanced Technologies Applied to PT6C-67A Tiltrotor Engine Design", International Annual Forum of the American Helicopter Society, May 9, 2001, 16 pages.
European Official Action in related European Application No. 14150196.5, dated Sep. 16, 2014, 5 pages.
The Boeing Company, V/Stol Tilt Rotor Aircraft Study, vol. I, Conceptual Design of Useful Military and/or Commercial Aircraft, dated Mar. 1972, 144 pages.
The Boeing Company, V/Stol Tilt Rotor Aircraft Study, vol. II, Preliminary Design of Research Aircraft, dated Mar. 1972, 347 pages.
European Search Report in related European Application No. 14161807.4, dated Jun. 24, 2014, 3 pages.
European Office Action in related European Application No. 14150196.5, dated Apr. 14, 2015, 6 pages.
Author Unknown, Engine Nose Gearbox and Quill Shaft Removal/Installation—TM-1-1520-238-23-4_210, May 16, 1994, 2 pages.
Author Unknown, Technical Manual Aviation Unit and Intermediate Maintenance Manual vol. 1 of 9 Helicopter, Attack, AH-64A Apache (NSN 1520-01-106-9519) (EIC: RHA) Chapter 1 Aircraft General Glossary Alphabetical Index, May 16, 1994, 23 pages.
European Notice of Allowance (71-3) in related European Application No. 14161807.4, dated Jul. 9, 2015, 36 pages.
Canadian Office Action in related Canadian Application No. 2,859,484, dated Jul. 17, 2015, 4 pages.

* cited by examiner

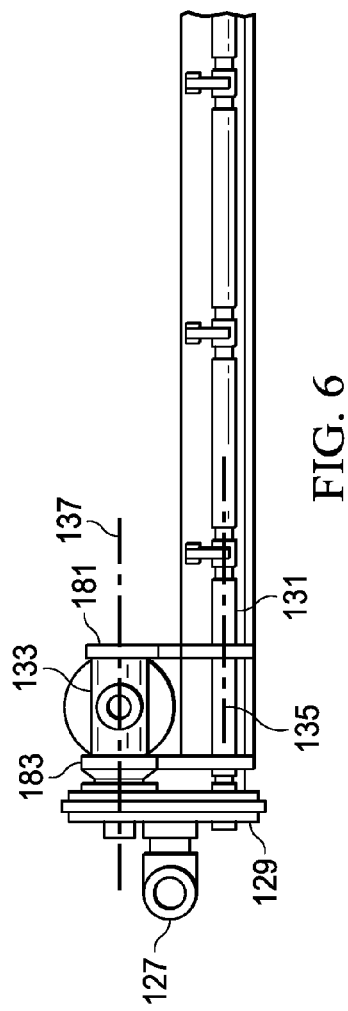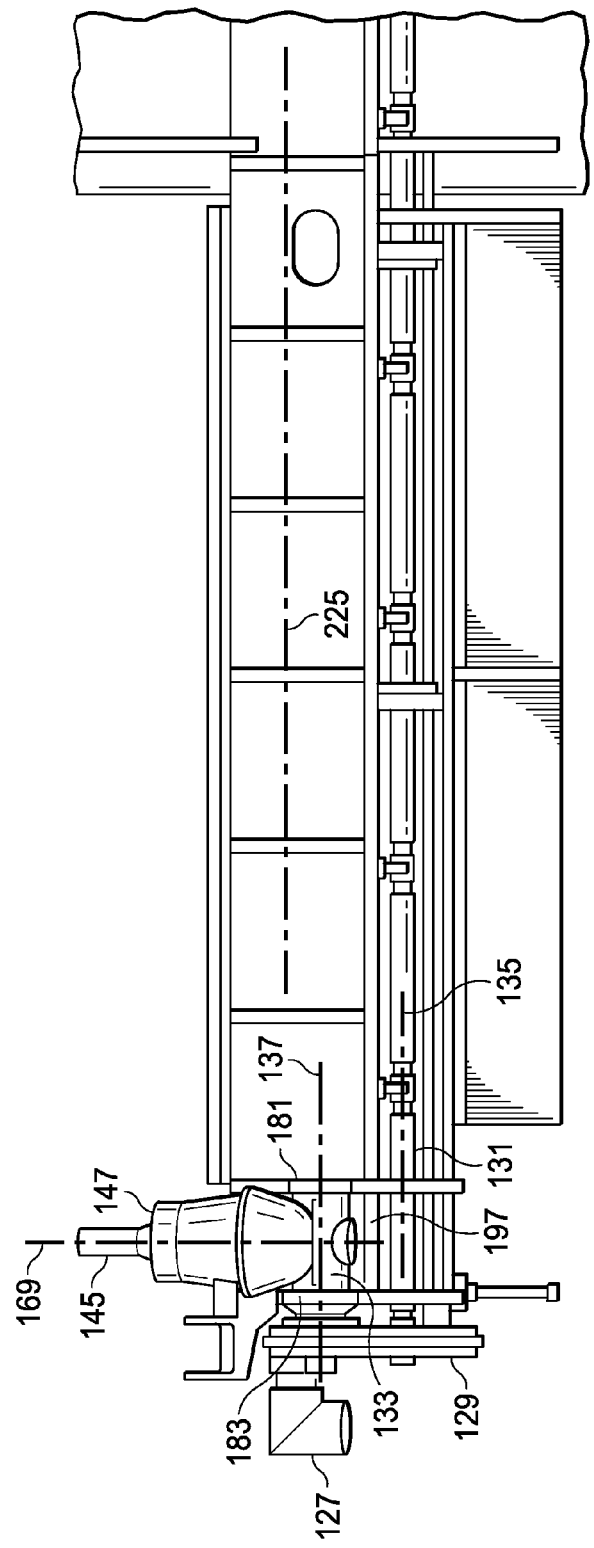

FIXED ENGINE AND ROTATING PROPROTOR ARRANGEMENT FOR A TILTROTOR AIRCRAFT

BACKGROUND

1. Technical Field

The present disclosure relates to a fixed engine and rotating proprotor arrangement for a tiltrotor aircraft. The present disclosure also relates to a method and apparatus of connecting a fixed drive system to a rotating drive system for a tiltrotor aircraft.

2. Description of Related Art

A conventional tiltrotor aircraft configuration can include a fixed engine with a rotating proprotor; however, conventional packaging arrangements of the fixed engine and the rotating proprotor can have significant shortcomings. Further, the location of the fixed engine and the rotating proprotor in relation to each other, as well as to the wing structure, can have significant influence upon the size and weight of the supporting structure, as well as the complexity of servicing procedures. For example, a rotating proprotor that is cantilevered outboard of the tip end of the wing can require significant structure to adequately support and prevent operationally induced deflection. Further, a rotating proprotor embedded in the wing structure can be difficult and time-consuming to perform maintenance thereon.

Hence, there is a need for a fixed engine and rotating proprotor arrangement that can be adequately supported with minimal structural mass, while also providing efficient maintainability.

Furthermore, a tiltrotor aircraft may have a fixed engine and a rotating proprotor with a gear and shaft to transfer torque therebetween. During operation, the fixed engine and the rotating proprotor may each endure a different operational loading which can induce operational misalignment therebetween. Also, misalignment can result from manufacturing and assembly tolerances. Designing the aircraft with structure with sufficient strength to resist the operational and tolerance misalignment therebetween can be undesirable due to the weight thereof. Further, conventional tiltrotor aircraft may have a torque transferring shaft between the fixed engine and the rotating proprotor that is burdensome to remove for maintenance and/or inspection, thus increasing the operational costs associated with operating the aircraft and performing maintenance and/or inspection thereof.

Hence, there is a need for a torque transferring device between a fixed engine system and a rotating proprotor of a tiltrotor aircraft that can allow for misalignment between the two. Further, there is a need for a torque transferring shaft that can be easily removed during a maintenance and/or inspection procedure.

DESCRIPTION OF THE DRAWINGS

The novel features believed characteristic of the method and apparatus of the present disclosure are set forth in the appended claims. However, the method and apparatus itself, as well as a preferred mode of use, and further objectives and advantages thereof, will best be understood by reference to the following detailed description when read in conjunction with the accompanying drawings, wherein:

FIG. 6 is a partial perspective view of a propulsion system portion of the tiltrotor aircraft, according to one example embodiment;

FIG. 7 is a partial top view of the tiltrotor aircraft, according to one example embodiment;

DESCRIPTION OF THE PREFERRED EMBODIMENT

Illustrative embodiments of the method and apparatus of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
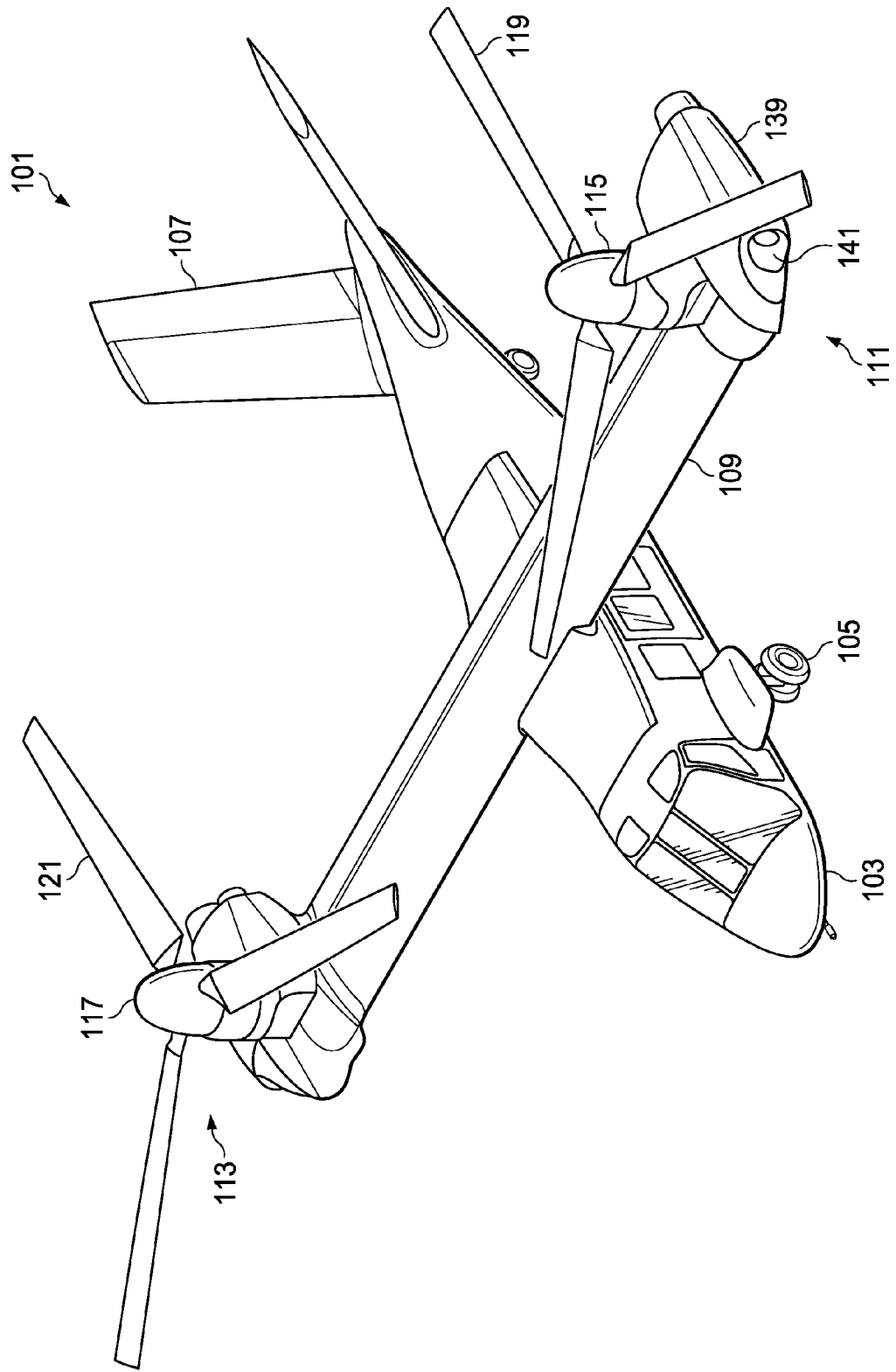
FIG. 1 is a perspective view of a tiltrotor aircraft in helicopter mode, according to one example embodiment.
Figure 2:
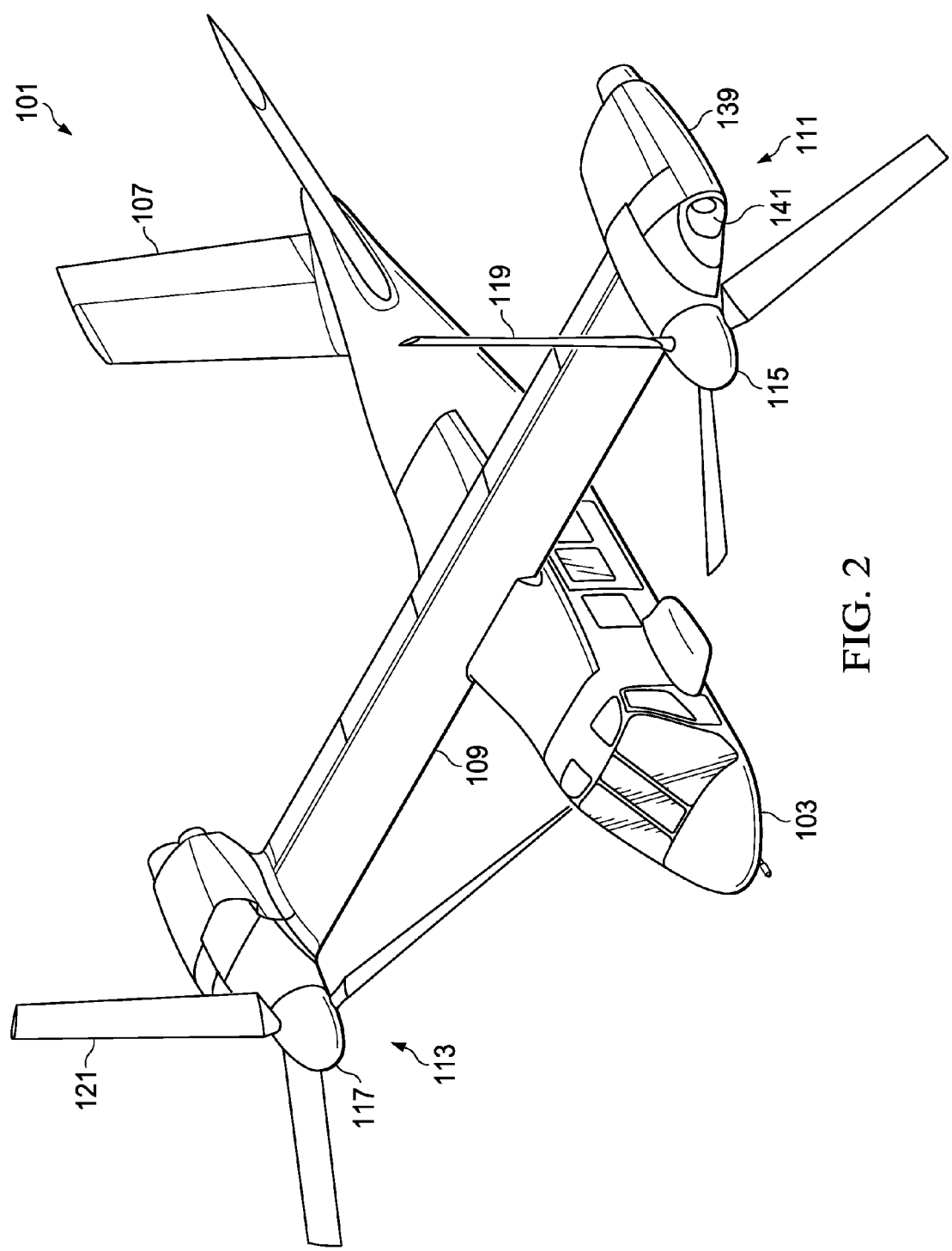
FIG. 2 is a perspective view of a tiltrotor aircraft in airplane mode, according to one example embodiment.
Figure 3:
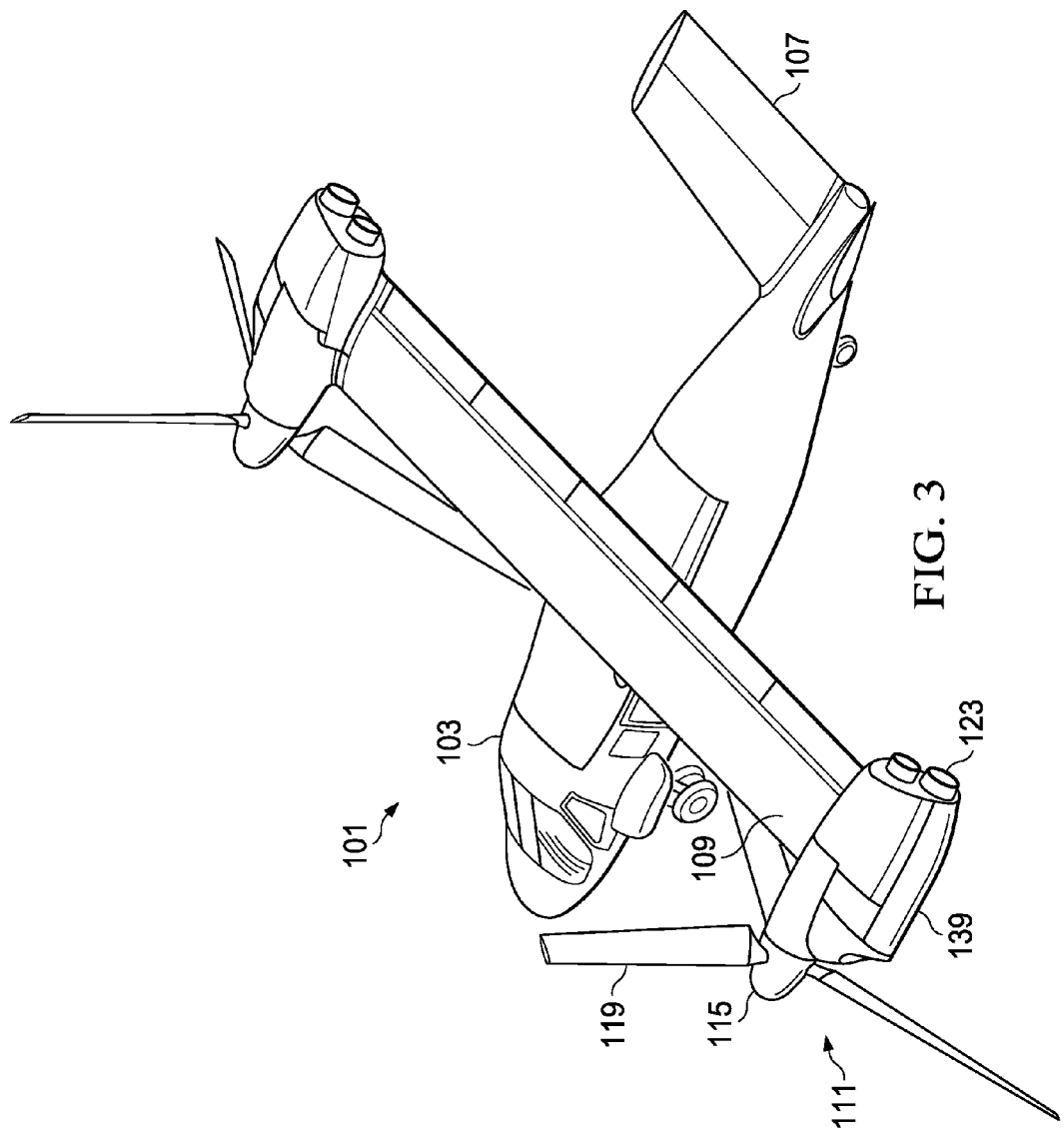
FIG. 3 is a perspective view of a tiltrotor aircraft in airplane mode, according to one example embodiment.
Figure 4:
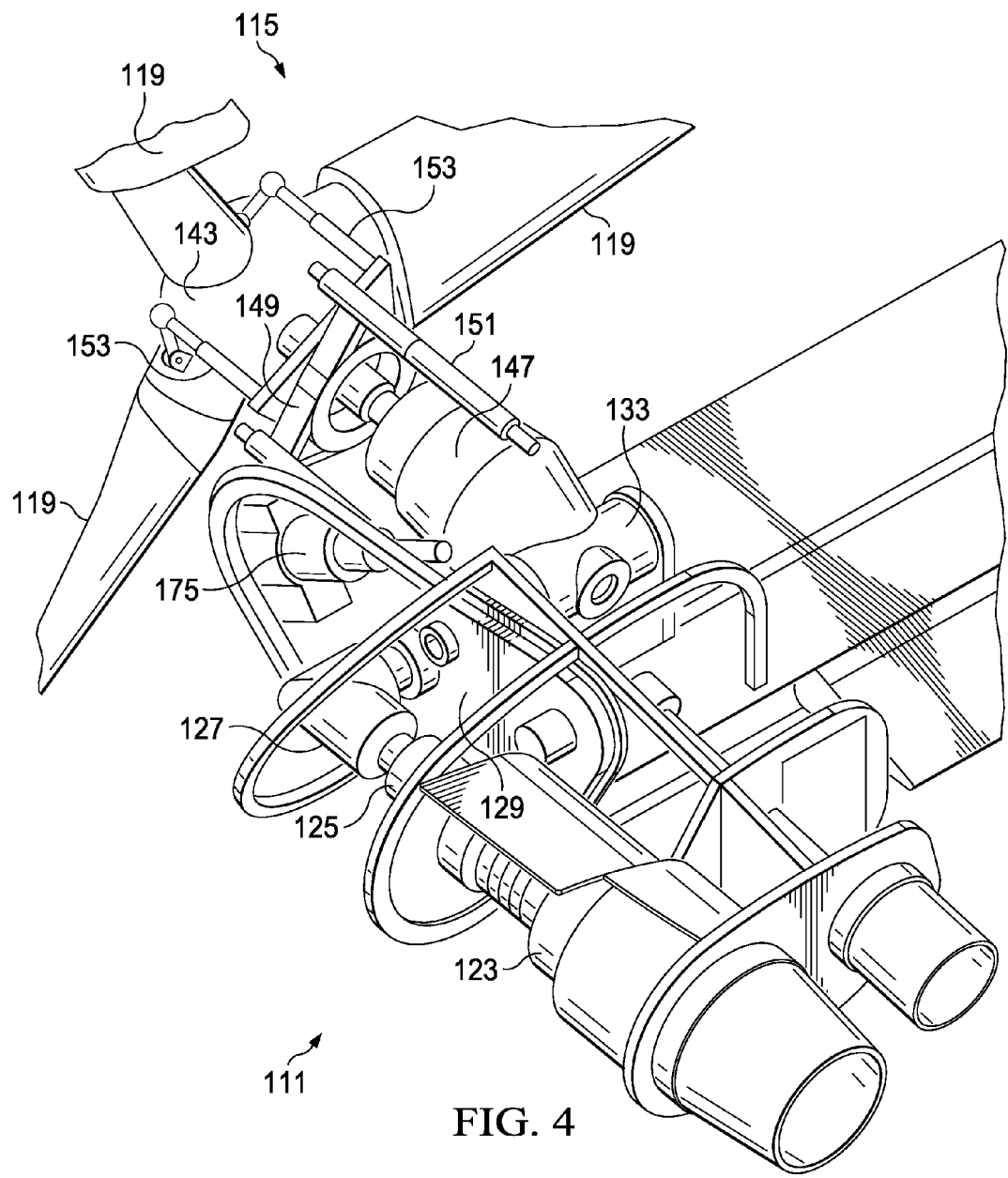
FIG. 4 is a partial perspective view of a propulsion system portion of the tiltrotor aircraft, according to one example embodiment.

Referring to FIGS. 1 and 2 in the drawings, a tiltrotor aircraft 101 is illustrated. Tiltrotor aircraft 101 can include a fuselage 103, a landing gear 105, a tail member 107, a wing 109, a propulsion system 111, and a propulsion system 113. Each propulsion system 111 and 113 includes a fixed engine and a rotatable proprotor 115 and 117, respectively. Each rotatable proprotor 115 and 117 have a plurality of rotor blades 119 and 121, respectively, associated therewith. The position of proprotors 115 and 117, as well as the pitch of rotor blades 119 and 121, can be selectively controlled in order to selectively control direction, thrust, and lift of tiltrotor aircraft 101.

FIG. 1 illustrates tiltrotor aircraft 101 in helicopter mode, in which proprotors 115 and 117 are positioned substantially vertical to provide a lifting thrust. FIG. 2 illustrates tiltrotor aircraft 101 in an airplane mode, in which proprotors 115 and 117 are positioned substantially horizontal to provide a forward thrust in which a lifting force is supplied by wing 109. It should be appreciated that tiltrotor aircraft can be operated such that proprotors 115 and 117 are selectively positioned between airplane mode and helicopter mode, which can be referred to as a conversion mode.

The propulsion system 113 is substantially symmetric to the propulsion system 111; therefore, for sake of efficiency certain features will be disclosed only with regard to propulsion system 111. However, one of ordinary skill in the art would fully appreciate an understanding of propulsion system 113 based upon the disclosure herein of propulsion system 111.

Further, propulsion systems 111 and 113 are illustrated in the context of tiltrotor aircraft 101; however, propulsion systems 111 and 113 can be implemented on other tiltrotor aircraft. For example, an alternative embodiment may include a quad tiltrotor that has an additional wing member aft of wing 109, the additional wing member can have additional propulsion systems similar to propulsion systems 111 and 113. In another embodiment, propulsion systems 111 and 113 can be used with an unmanned version of tiltrotor aircraft 101. Further, propulsion systems 111 and 113 can be integrated into a variety of tiltrotor aircraft configurations.

Referring now also to FIGS. 3-11, propulsion system 111 is disclosed in further detail. Propulsion system 111 includes an engine 123 that is fixed relative to wing 109. An engine output shaft 125 transfers power from engine 123 to a spiral bevel gearbox 127 that includes spiral bevel gears to change torque direction by 90 degrees from engine 123 to a fixed gearbox 129 via a clutch. Fixed gearbox 129 includes a plurality of gears, such as helical gears, in a gear train that are coupled to an interconnect drive shaft 131, and a quill shaft 203. Torque is transferred to an input 167 in spindle gearbox 133 of proprotor gearbox 147 through the quill shaft 203.

Figure 8:
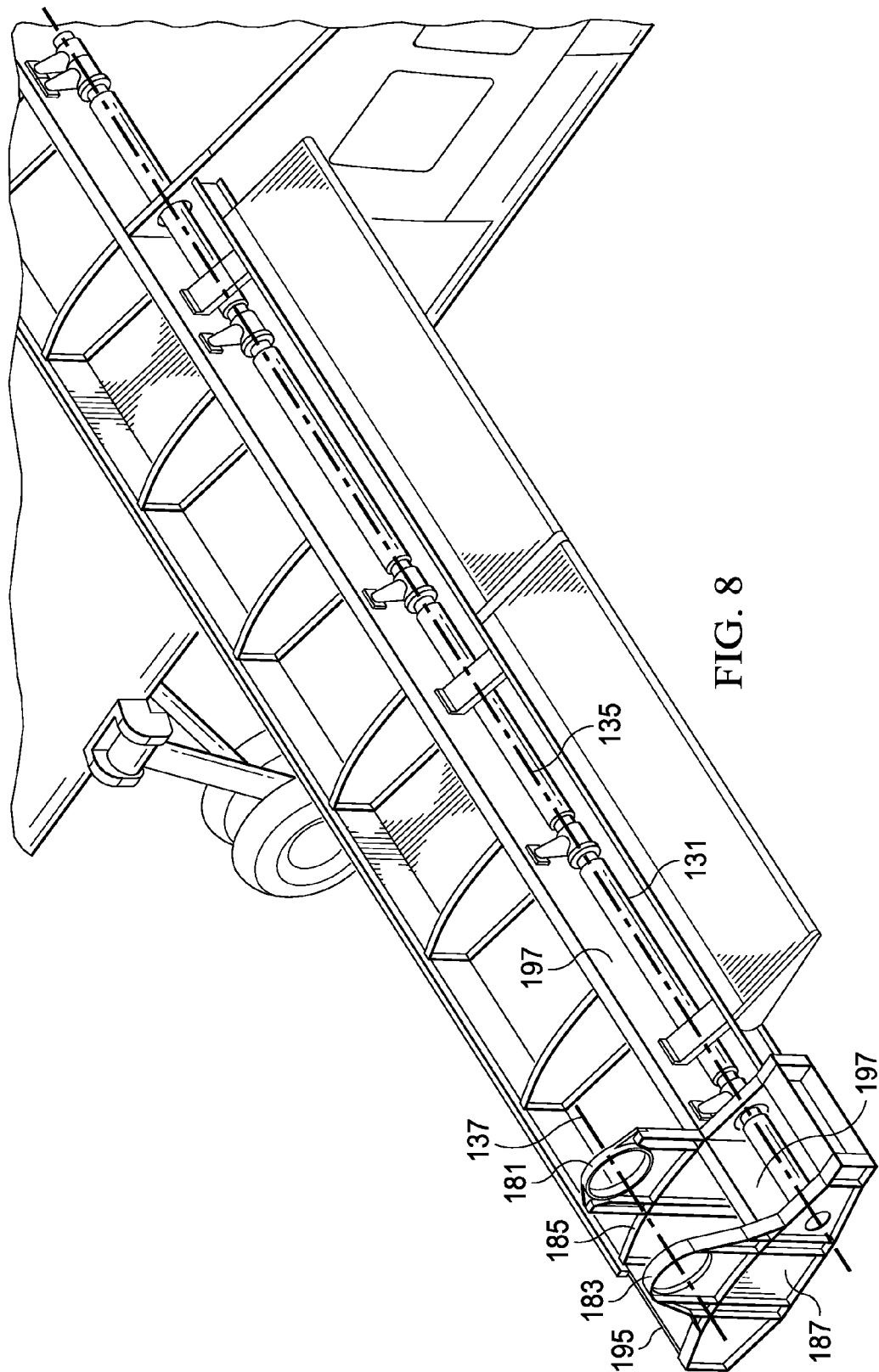
FIG. 8 is a partial perspective view of the tiltrotor aircraft, according to one example embodiment.
Figure 9:
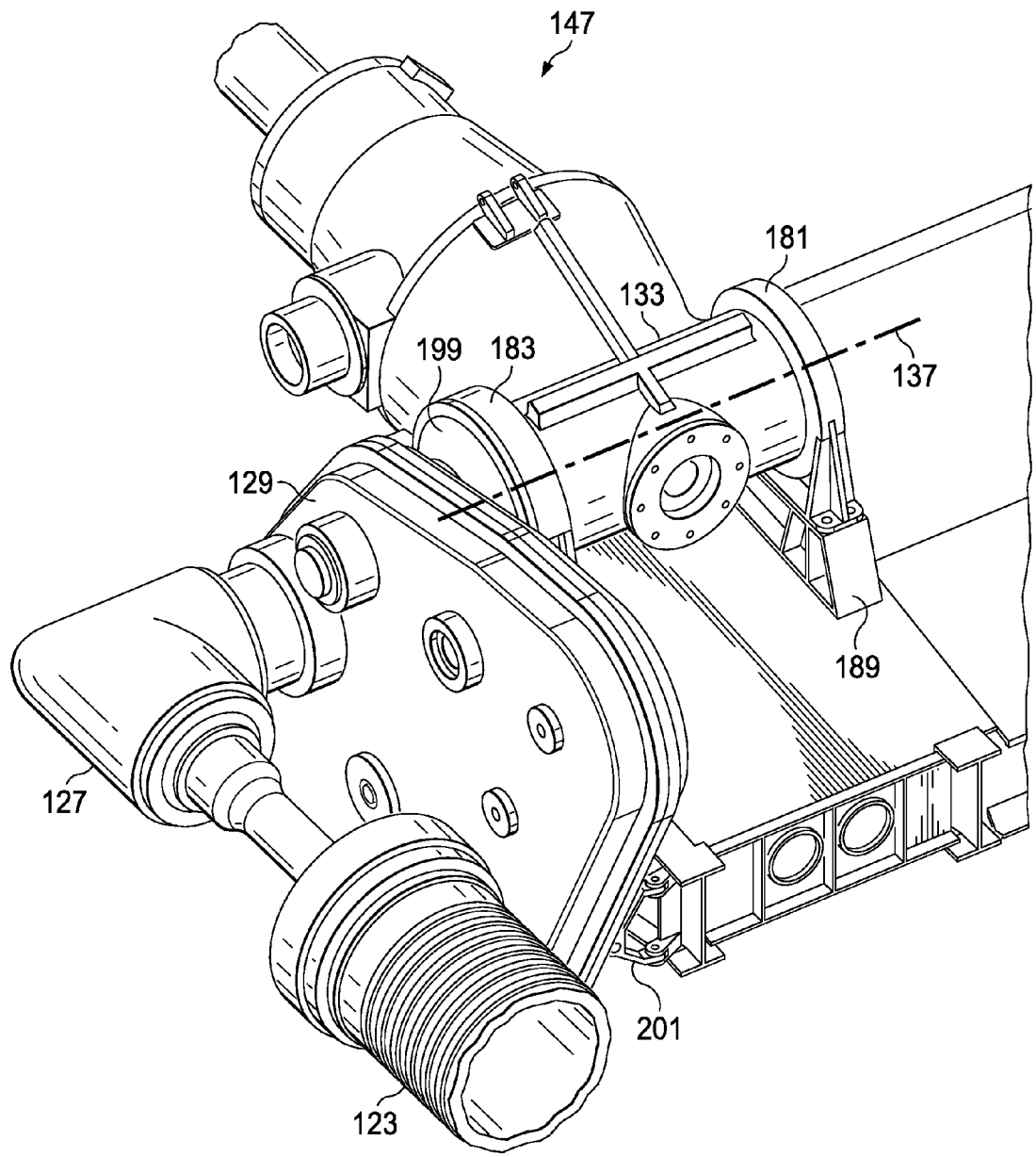
FIG. 9 is a partial perspective view of the tiltrotor aircraft, according to one example embodiment.
Figure 10:
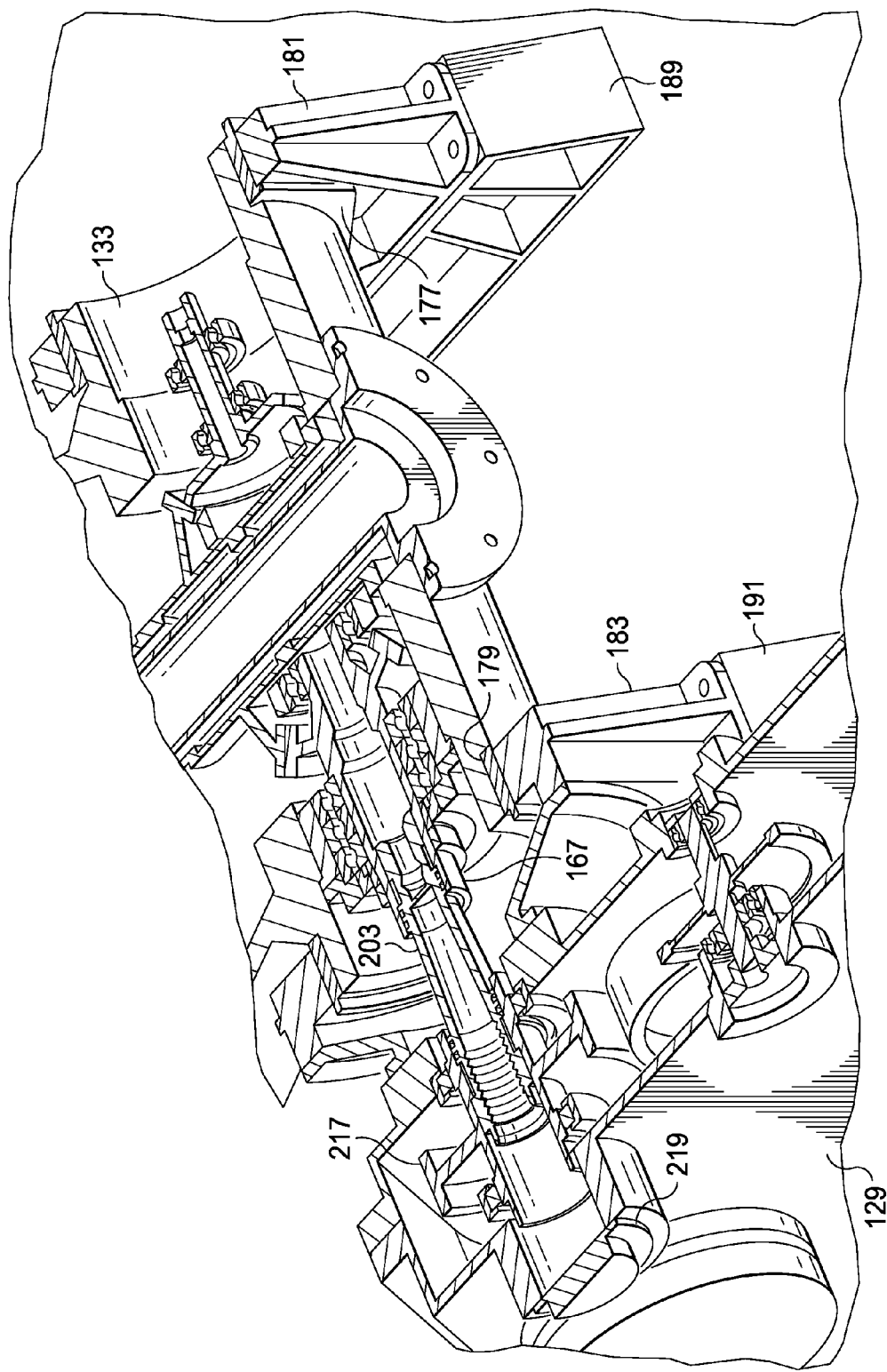
FIG. 10 is a cross-sectional view of the propulsion system, according to one example embodiment.
Figure 11:
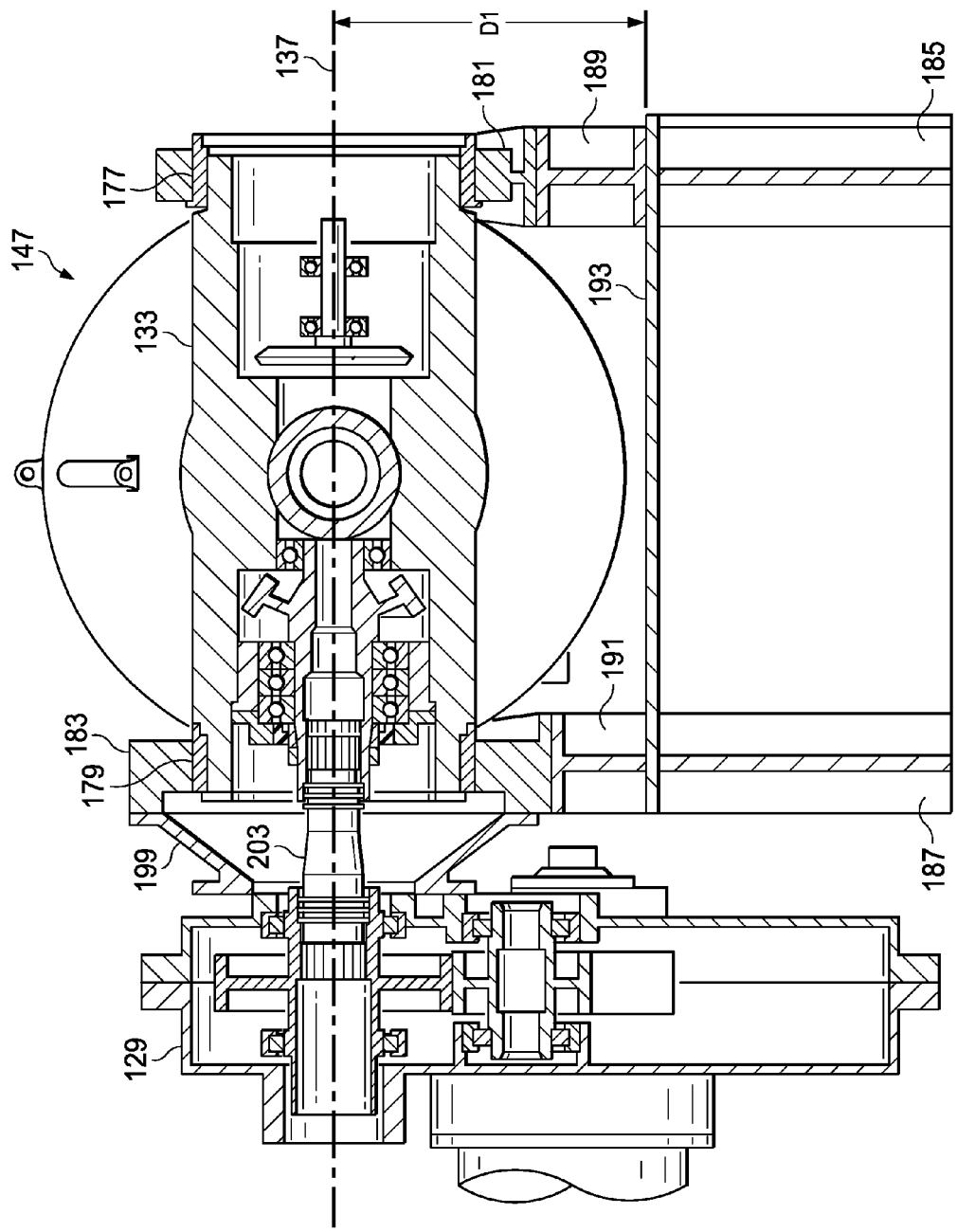
FIG. 11 is a cross-sectional view of the propulsion system, according to one example embodiment.

The interconnect drive shaft 131 provides a torque path that enables a single engine to provide torque to both proprotors 111 and 113 in the event of a failure of the other engine. In the illustrated embodiment, interconnect drive shaft 131 has a rotational axis 135 that is vertically lower and horizontally aft of the conversion axis 137 of the spindle gearbox 133. Conversion axis 137 is parallel to a lengthwise axis 225 of wing 109. Referring in particular to FIG. 8, interconnect drive shaft 131 includes a plurality of segments that share a common rotational axis 135. Location of interconnect drive shaft 131 aft of the aft wing spar 197 provides for optimal integration with fixed gearbox 129 without interfering with the primary torque transfer in the quill shaft 203 between fixed gearbox 129 and spindle gearbox 133; as such, the conversion axis 137 of spindle gearbox 133 is parallel to the rotational axis 135 and interconnect drive shaft 131, but located forward and above rotational axis 135.

Engine 123 can be housed and supported in an engine nacelle 139. Engine nacelle 139 can include an inlet 141, aerodynamic fairings, and exhaust, as well as other structures and systems to support and facilitate the operation of engine 123.

The proprotor 115 of propulsion system 111 can include a plurality of rotor blades 119 coupled to a yoke 143. The yoke 143 can be coupled to a mast 145. Mast 145 is coupled to a proprotor gearbox 147. It should be appreciated that proprotor 115 can include other components, such as a swashplate 149 that is selectively actuated by a plurality of actuators 151 to selectively control the pitch of rotor blades 119 via pitch links 153.

Figure 5:
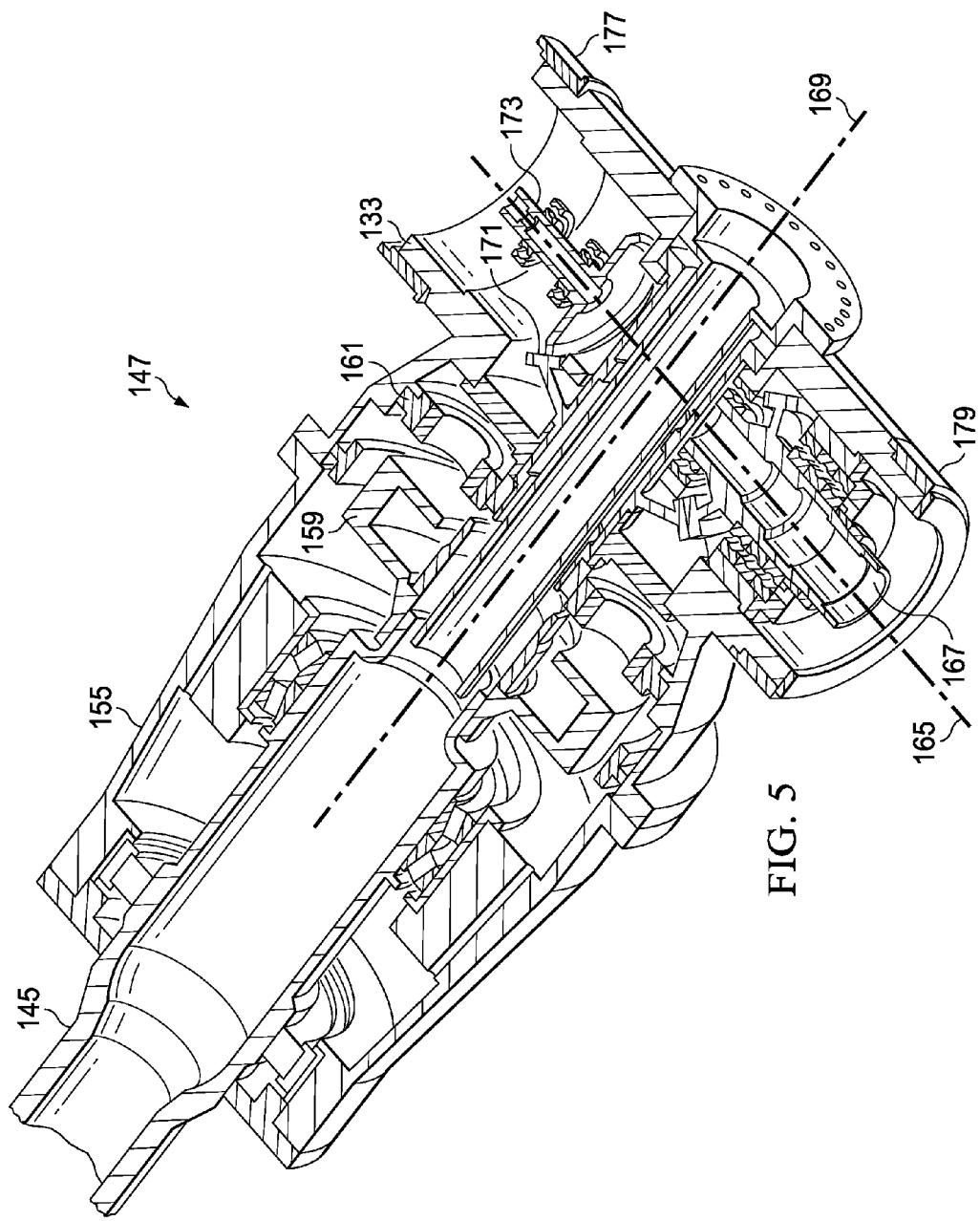
FIG. 5 is a cross-sectional view of a proprotor of the propulsion system, according to one example embodiment.

Proprotor gearbox 147 is configured to transfer power and reduce speed to mast 145. Further, proprotor gearbox 147 provides operational support of proprotor 115. Referring in particular to FIG. 5, proprotor gearbox 147 can include a top case 155 portion and spindle gearbox 133. Speed reduction is accomplished by a low speed planetary gear assembly 159 and a high speed planetary gear assembly 161. A spiral bevel gear assembly 163 includes a spiral bevel gear input 167 and a spiral bevel gear output 171. Spiral bevel gear assembly 163 changes power direction from along a centerline axis 165 of spiral bevel gear input 167 to a centerline axis 169 of spiral bevel gear output 171. An accessory drive 173 can be coupled to spiral bevel gear output 171. It should be appreciated that proprotor gearbox 147 can include any bearings, lubrication systems, and other gearbox related components that may be beneficial for operation.

During operation, a conversion actuator 175 (shown at least in FIG. 4) can be actuated so as to selectively rotate proprotor gearbox 147 about a conversion axis 137 that corresponds with axis 165, which in turn selectively positions proprotor 115 between helicopter mode (shown in FIG. 1) and airplane mode (shown in FIG. 2). The operational loads, such as thrust loads, are transmitted through rotor mast 145 and into the spindle gearbox 133 of proprotor gearbox 147, and thus the structural support of spindle gearbox 133 is critical.

In the illustrated embodiment, the spindle gearbox 133 of proprotor gearbox 117 is mounted to an inboard pillow block 181 with an inboard bearing assembly 177. Similarly, spindle gearbox 133 of proprotor gearbox 147 is mounted to an outboard pillow block 183 with an outboard bearing assembly 179. Thus, spindle gearbox 133 is structurally supported but rotatable about conversion axis 137 by conversion actuator 175. Inboard pillow block 181 is structurally coupled to an inboard rib 185. Similarly, outboard pillow block 183 is structurally coupled to an outboard rib 187. In one embodiment, an inboard intermediate support 189 is utilized as a structural element between inboard pillow block 181 and inboard rib 185, and an outboard intermediate support 191 is similarly utilized as a structural element between outboard pillow block 183 and outboard rib 187. It should be appreciated that the exact structural configuration is implementation specific, and that structural components can be combined and/or separated to meet implementation specific requirements.

Spindle gearbox 133 of proprotor gearbox 117 is located above a surface of an upper wing skin 193 at a distance D1 (shown in FIG. 11), while also being approximately centered between inboard rib 185 and outboard rib 187. One advantage of locating the proprotor gearbox 147 above the surface of upper wing skin 193 is that the fore/aft location of proprotor gearbox 147 can be easily tailored to align the aircraft center of gravity (CG) with the conversion axis 137 while the propulsion system 111 is in helicopter mode, while also aligning the aircraft center of gravity (CG) with the wing aerodynamic center of lift while the propulsion system 111 is in airplane mode. Because the aircraft center of gravity (CG) shifts as the proprotor 115 rotates between helicopter mode and airplane mode, the distance from the location of proprotor 115 in helicopter mode and airplane mode center of lift must correspond. As such, locating proprotor gearbox 147 above the wing allows the exact fore/aft location to be optimized accordingly, while also structurally attaching the proprotor gearbox 147 with in a zone of the torque box formed by forward wing spar 195, aft wing spar 197, inboard rib 185, and outboard rib 187.

The location of the spindle gearbox 133 portion of proprotor gearbox 147 provides an efficient structural support for enduring operational loads by being mounted to inboard rib 185 and outboard rib 187, which together with a forward wing spar 195 and an aft wing spar 197, form a structural torque box. For example, when aircraft 101 is in helicopter mode, torque about mast axis 169 is reacted by the torque box collectively formed by inboard rib 185, outboard rib 187, forward wing spar 195, and aft wing spar 197. It should be noted that location of spindle gearbox 133 of proprotor gearbox 147 also positions the mast axis 169, while in helicopter mode, inboard of outboard rib 187, outboard of inboard rib 185, forward of aft spar 197, and aft of forward spar 195, which allows the axis of the torque to be inside of the torque box structure, rather than cantilevered outside of the torque box structure. In contrast, a spindle gearbox location outside (such as outboard, forward, or aft) would cause a moment that would increase operational loading, thus requiring heavier and less efficient structural support.

Fixed gearbox 129 is secured to outboard pillow block 183 with a housing 199. Housing 199 is a conical structure with one or more flanges configured for coupling to gearbox 129 and outboard pillow block 183. An additional support may be utilized to provide additional support between gearbox 129 and the wing structure, such as supplemental support 201 (shown in FIG. 9); however, housing 199 is the primary support structure therebetween. In one embodiment, supplemental support 201 is strong in the inboard/outboard and vertical directions, but weak in the fore/aft direction. Housing 199 is significant because it is configured to minimize misalignment between fixed gearbox 129 and spindle gearbox 133. If the primary attachment structure was not common with the attachment structure of proprotor gearbox 147, then operation loading, such as load deflection and/or thermal growth, would dramatically increase the misalignment therebetween.

Power is transferred from fixed gearbox 129 to spindle gearbox 133 of proprotor gearbox 147 through the quill shaft 203. Quill shaft 203 is a floating shaft configured to accept any misalignment due to manufacturing tolerances and operational effects between the fixed system (fixed gearbox 129) and the rotating system (proprotor gearbox 147). Quill shaft 203 is configured to be assembled and disassembled independently from the fixed and rotating systems. As such, quill shaft 203 can be removed without removing either of the fixed and rotating systems.

Figure 12:
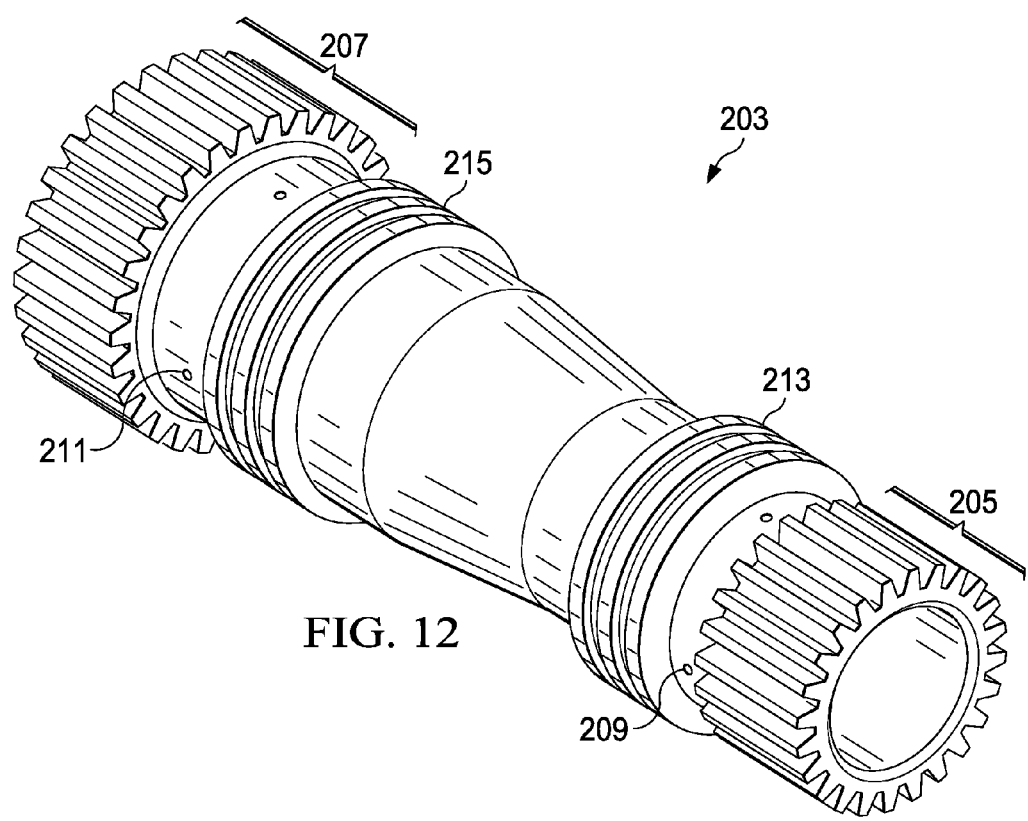
FIG. 12 is a perspective view of a quill shaft, according to one example embodiment.
Figure 13:
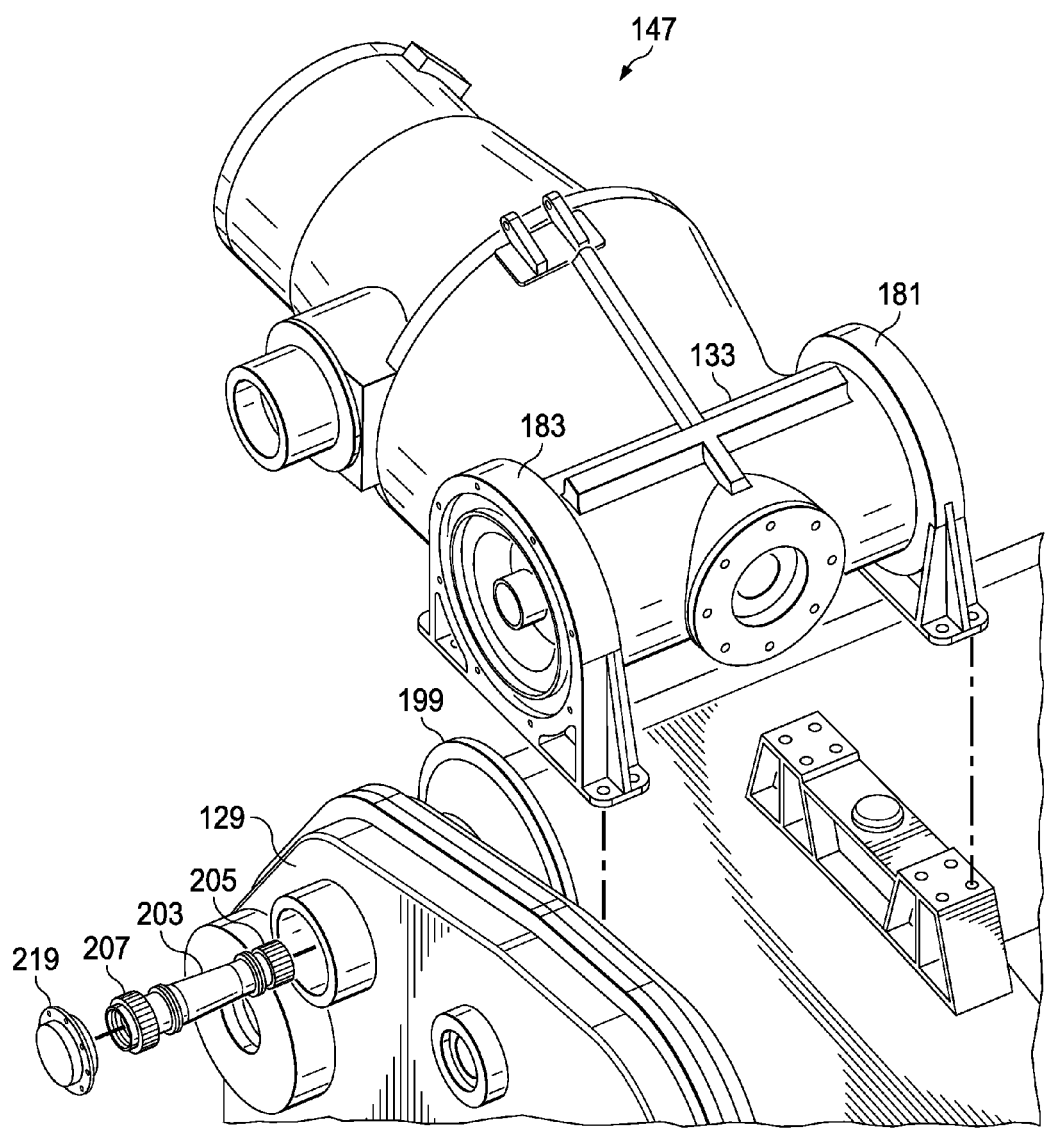
FIG. 13 is a perspective view of the propulsion system in a partially disassembled state, according to one example embodiment.
Figure 14:
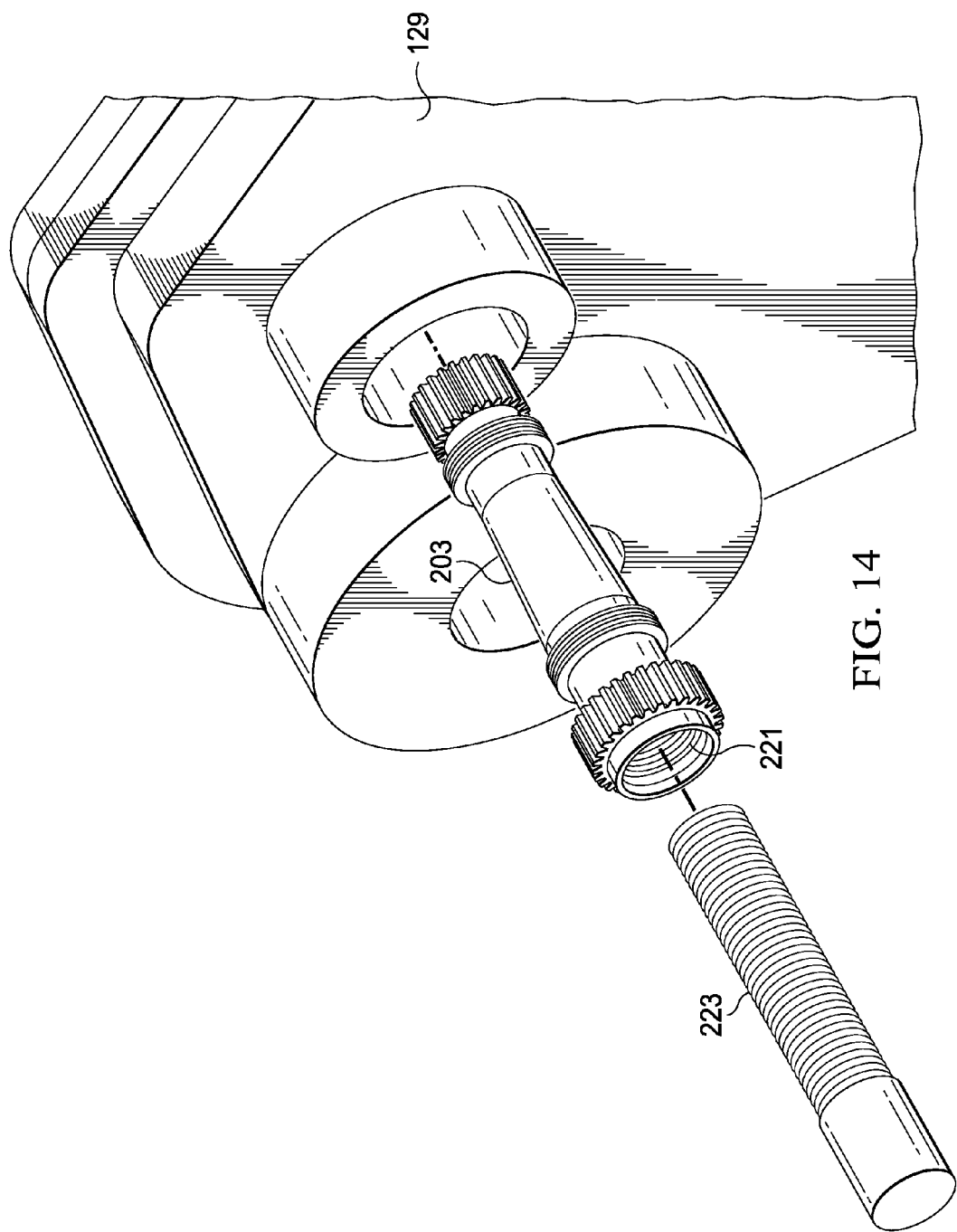
FIG. 14 is a perspective view of the propulsion system in a partially disassembled state, according to one example embodiment.

Referring also to FIGS. 12-14, quill shaft 203 can have a first splined portion 205 and a second splined portion 207. In the illustrated embodiment, the first splined portion 205 has a smaller diameter than the second splined portion 207, thus the first splined portion 205 is located inboard and the second splined portion 207 is located outboard so that the quill shaft 203 can be removed to the outboard direction for inspection/maintenance thereof. Quill shaft 203 can include one or more inboard lubrication ports 209 and outboard lubrication ports 211. Quill shaft 203 can also include a first sect of o-ring glands 213 and a second set of o-ring glands 215.

During operation, second splined portion 207 is in torque engagement with an output gear 217 of fixed gearbox 129 while first splined portion 205 is in torque engagement with a splined portion of the input 167 to spindle gearbox 133. The first splined portion 205 and second splined portion 207 are crowned to promote teeth engagement in the event of non-axial misalignment between spindle gearbox 133 and fixed gearbox 129. Lubrication oil is circulated to the mating surfaces of the first splined portion 205 through outboard lubrication ports 211, the seals associated with the second set of o-ring glands forcing the lubrication fluid to flow to the first splined portion 205 instead of flowing toward the center of quill shaft 203. Similarly, lubrication oil is circulated to the mating surfaces of the second splined portion 207 through inboard lubrication ports 209, the seals associated with the first set of o-ring glands forcing the lubrication fluid to flow to the second splined portion 207 instead of flowing toward the center of quill shaft 203.

One unique aspect of the configuration of quill shaft 203 in conjunction with spindle gearbox 133 and fixed gearbox 129 is that quill shaft 203 can be removed without removing either of the spindle gearbox 133 and fixed gearbox 129. An access cover 219 can be removed thereby accessing the second splined portion 207 of quill shaft 203. An interior portion 221 includes a feature, such as threads, for which a removal tool 223 can attach thereto. In one embodiment, interior portion 221 has female threads, while removal tool 223 has male threads that mate thereto. Upon attachment of removal tool 223 to quill shaft 203, the quill shaft 203 can be removed by pulling out in an outboard direction along the centerline axis of the quill shaft 203. Quill shaft 203 is critical for the operation of aircraft 101, as such, safety and efficiency of operation is improved by increasing the ease for which quill shaft 203 can be inspected.

The embodiments disclosed herein provide one or more of the following advantages. For example, the location and orientation of proprotor in relation to the wing structure enables the proprotor to be adequately supported with minimal structural mass, while also providing efficient maintainability. Location of the proprotor above the wing allows the proprotor to be removed in an upward direction upon removing the quill shaft, as such, the fixed gearbox and engine don't have to be removed or disassembled when a maintenance action only requires servicing of the proprotor.

Further advantages include a quill shaft located between the fixed gearbox and a rotating spindle gearbox of the proprotor that allows for misalignment between the two. For example, the splined portions of the quill shaft allow for axial translation or floating in relation to the mating features on the fixed gearbox and the spindle gearbox, such as when operation of the tiltrotor causes misalignment in the axial direction of the quill shaft. Further, the splined portions on the quill shaft can be crowned to further allow for non-axial misalignment, such as fore/aft misalignment. Further, quill shaft is configured to be easily removed during a maintenance and/or inspection procedure.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A propulsion system for a tiltrotor aircraft, the propulsion system comprising:
    an engine disposed at a fixed location relative to a wing member, the wing member having a first rib, a second rib, a first spar, second spar; and an upper wing skin;
    a proprotor mechanically coupled to the engine, the proprotor comprising:
        a plurality of rotor blades;
        a rotor mast having a rotor mast axis of rotation;
        a spindle gearbox coupled to the rotor mast, the spindle gearbox being rotatable about a conversion axis, the conversion axis and the rotor mast axis of rotation intersecting at an intersection point, the intersection point being centrally located in a central portion, the central portion being a central region aft of the first spar, forward of the second spar, outboard of the first rib, and inboard of the second rib, and above an airfoil surface profile of the upper wing skin;
    wherein the first rib, the second rib, the first spar, and the second spar are coupled together to form a torque box.

2. The propulsion system according to claim 1, wherein the conversion axis is parallel to a lengthwise axis of the wing member.

3. The propulsion system according to claim 1, the propulsion system further comprising:
    a fixed gearbox in a drive path between the engine and the proprotor.

4. The propulsion system according to claim 3, further comprising:
    an interconnect drive shaft coupled to the fixed gearbox, the interconnect drive shaft be rotatable about an interconnect axis;
    wherein the conversion axis of the spindle gearbox is parallel to the interconnect axis, the conversion axis also being located forward and upward from the interconnect axis.

5. The propulsion system according to claim 3, the fixed gearbox further comprising:
    a plurality of gears in a gear train, the plurality of gears including a first gear coupled to an interconnect drive shaft and a second gear coupled to a quill shaft.

6. The propulsion system according to claim 5, wherein the rotational axis of the plurality of gears are parallel to the conversion axis of the spindle gearbox.

7. The propulsion system according to claim 1, the propulsion system further comprising:
    an outboard housing;
    an inboard housing;
    wherein an outboard portion of the spindle gearbox is rotatably coupled to the outboard housing, and the inboard portion of the spindle gearbox is rotatably coupled to the inboard housing.

8. The propulsion system according to claim 7, the propulsion system further comprising:
    an inboard bearing assembly configured to provide rotational capability between the inboard housing and the inboard portion of the spindle gearbox;
    an outboard bearing assembly configured to provide rotational capability between the outboard housing and the outboard portion of the spindle gearbox.

9. The propulsion system according to claim 7, the propulsion system further comprising:
    an inboard pillow block configured to structurally locate the inboard housing above the upper wing skin of the wing member; and
    an outboard pillow block configured to structurally locate the outboard housing above the upper wing skin of the wing member.

10. The propulsion system according to claim 9, wherein the inboard pillow block is coupled to the first rib.

11. The propulsion system according to claim 9, wherein the outboard pillow block is coupled to the second rib.

12. The propulsion system according to claim 1, the propulsion system further comprising:
    a housing configured to secure the fixed gearbox to an outboard frame that rotatably couples the spindle gearbox to a structure of the wing member.

13. The propulsion system according to claim 12, wherein the housing is a conical shaped.

14. The propulsion system according to claim 12, the housing comprising:
    an inboard flange configured for coupling the housing to the outboard frame; and
    an outboard flange configured for coupling the housing to the fixed gearbox.

15. The propulsion system according to claim 12, the propulsion system further comprising:
    a quill shaft configured for transferring torque to the spindle gearbox, the quill shaft being centrally located within the housing.

16. A tiltrotor aircraft, comprising:
    a fuselage;
    a wing member having a first rib, a second rib, a first spar, second spar; and an upper wing skin;
    an engine disposed at a fixed location relative to the wing member; and
    a proprotor mechanically coupled to the engine, the proprotor comprising:
        a plurality of rotor blades;
        a rotor mast having a rotor mast axis of rotation;
        a spindle gearbox coupled to the rotor mast, the spindle gearbox being rotatable about a conversion axis, the conversion axis and the rotor mast axis of rotation intersecting at an intersection point, the intersection point being centrally located in a central portion, the central portion being a central region aft of the first spar, forward of the second spar, outboard of the first rib, and inboard of the second rib, and above an airfoil surface profile of the upper wing skin;
    wherein the first rib, the second rib, the first spar, and the second spar are coupled together to form a torque box.

* * * * *